United States Patent
Tissier

[15] 3,655,355
[45] Apr. 11, 1972

[54] METHOD AND APPARATUS FOR THE PRODUCTION OF SHEET GLASS

[72] Inventor: Pierre Tissier, Saint-Gobain, France

[73] Assignee: Compagnie De Saint-Gobain, Neuilly-sur-Seine, France

[22] Filed: Aug. 21, 1969

[21] Appl. No.: 851,905

[30] Foreign Application Priority Data

Aug. 27, 1968 France..................................164244

[52] U.S. Cl..................................65/83, 29/124, 65/101, 65/244, 65/354, 65/356

[51] Int. Cl. ......................................................C03b 13/18

[58] Field of Search..................65/354, 244, 245, 355, 356, 65/253, 161, 162, 29, 101, 83, 273; 165/48, 61

[56] References Cited

UNITED STATES PATENTS

| | | | |
|---|---|---|---|
| 1,413,766 | 1922 | Myers | 65/101 |
| 1,519,314 | 1924 | Koupal | 65/253 |
| 1,937,382 | 1933 | Cone | 65/356 X |
| 3,077,755 | 2/1963 | Jamnik et al | 65/253 |
| 3,218,141 | 11/1965 | Lambert | 65/83 X |

Primary Examiner—S. Leon Bashore
Assistant Examiner—Robert L. Lindsay, Jr.
Attorney—Dale A. Bauer, John L. Seymour and Bauer and Seymour

[57] ABSTRACT

Process and apparatus for improving the smoothness and planarity of a sheet or ribbon of glass having a surface temperature of about 780° to 920° C. and having a viscosity of the order of $10^{6.5}$ to $10^5$ poises just before passing to and between a pair of metallic spaced smoothing and reducing rollers maintained uniformly at a surface temperature selected from a range of about 400° to 650° C. and by which the ribbon is reduced to 75 percent to 95 percent of its thickness prior to entry between the rollers. The surface temperature of the rollers is selected inversely as the temperature of the glass, within the ranges stated, and as shown upon the graph of Figure 1.

9 Claims, 4 Drawing Figures

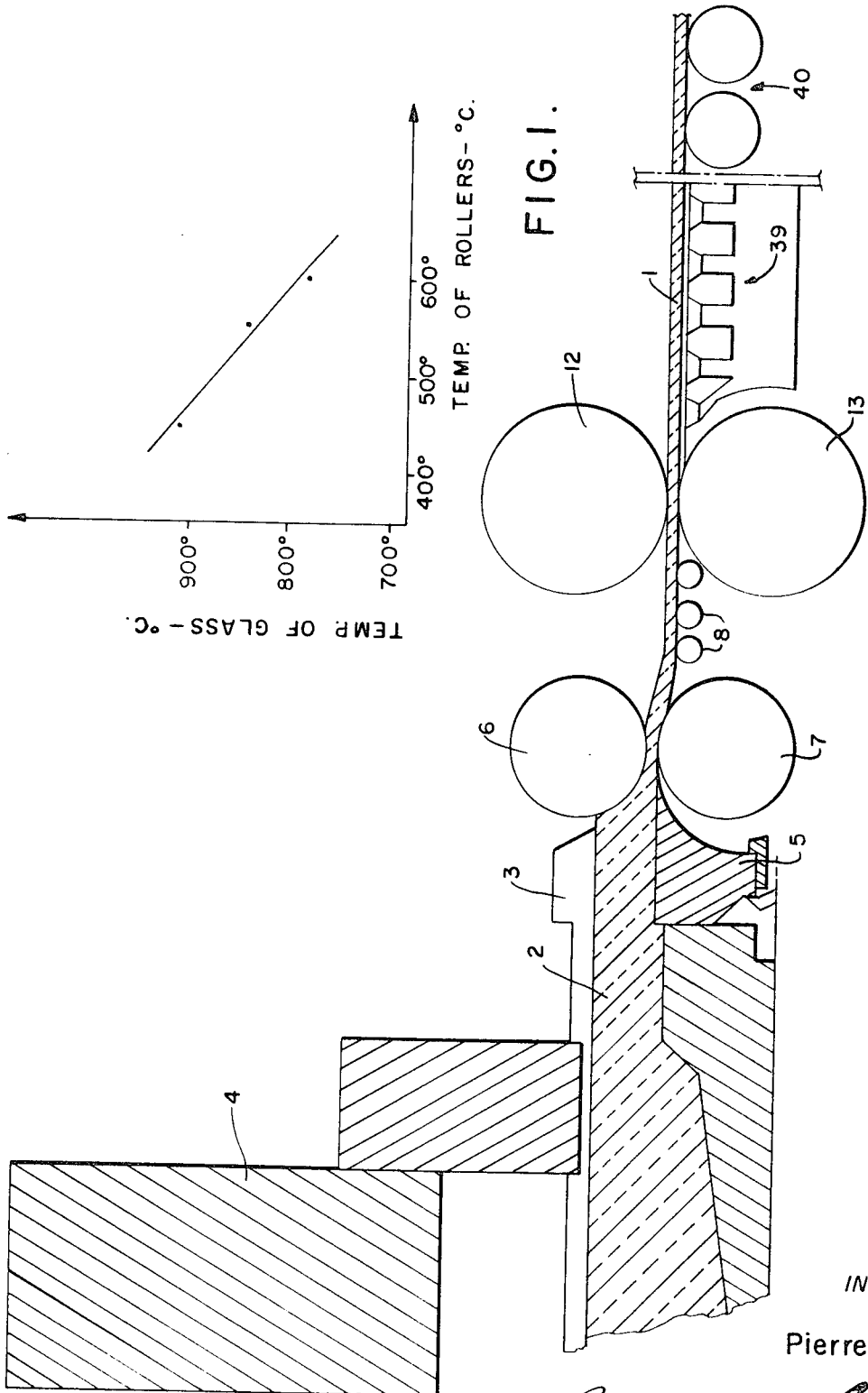

INVENTOR
Pierre Tissier

INVENTOR
Pierre Tissier

METHOD AND APPARATUS FOR THE PRODUCTION OF SHEET GLASS

This invention relates to a method of and means for the production of sheet glass by rolling.

In the past, serious difficulties have arisen in the manufacture of sheet glass by procedures such as drawing and/or rolling, because of surface defects in, and lack of planarity and smoothness of the completed product.

In the usual prior art procedure the glass flows or is drawn from the forehearth or draw pot of a melting tank, by and between rollers by which the incipient sheet is smoothed and reduced to sheet form of the desired thickness. I have found that because of temperature differences in and along the aforesaid rollers, corresponding differences in viscosities of the glass are effected which may cause local irregularities in thickness of the sheet, and which may be of the order of tenths of a millimeter. Such differences in viscosities may also cause local variations in the composition of the glass and these may further contribute to corresponding differences in thickness and smoothness of the completed glass.

Further, one of the principal drawbacks in the production of sheet glass by lamination, resides in defects of planarity of the glass ribbon, after it has passes in contact with and between the relatively cool surfaces of the laminating rollers. It is not possible to avoid or to eliminate such defects merely by raising the temperature of the rollers because such a procedure increases the tendency of the glass to adhere to the rollers and may thus create further defects.

In French Pat. No. 1,409,806, it is proposed to improve the planarity of the surfaces of the glass ribbon being formed, by subjecting it while plastic to the action of smoothing rollers having about the same surface temperature as the incipient ribbon. But after such procedure it is also necessary to remove from the surfaces of the ribbon, particles which are essentially infusible and which otherwise adhere to the hot glass rather than to the rollers themselves, and thus create surface irregularities in the finished glass.

The present invention enables, and has for its chief object, a method and apparatus by which the completed sheet glass has a planarity equivalent to that of a sheet after it has been ground and polished by prior art procedures.

A further object is to provide a method and apparatus wherein the aforesaid result is attained with roller temperatures materially below that at which particles adhere to the sheet. There is thus avoided the problems inherent when such particles or detritus are distributed over and embedded in the surfaces of the sheet or ribbon and which must be finally eliminated as by grinding and polishing. the rollers In conformity with the present invention the sheet glass in a cooling procedure, is passed between smooth planing rollers having a line of contact with the glass uniformly at about 400° to 650° C., the glass itself being cooled to about 780° to 920° C. The rollers define between them a space about 75 percent to 95 percent of the thickness of the glass just before it enters between them.

It is also possible to start the novel method with sheet glass previously formed and which is accordingly reheated to the temperature range above stated. The temperature has to be measured by an optical pyrometer because, due to its relatively low or poor heat conductivity the central portions or layers of the glass are hotter than its surface areas.

The temperature ranges given are valid for glass of compositions usually employed in production by lamination, such for example as:

| | |
|---|---|
| SiO$_2$ | 70 to 73% |
| Al$_2$O$_3$ | 0 to 3% |
| Na$_2$O+K$_2$O | 13.5 to 15.5% |
| CaO+MgO | 11 to 14% |
| Other ingredients | 0 to 3% |

When glass is employed having a composition essentially different from that given in the preceding table, a corresponding change in temperature is utilized from the range of 780° to 920° C., which as stated, is for glass having a viscosity of the order of $10^{6.5}$ to $10^5$ poises, such as is ordinarily used in glass formed by drawing or laminating. It has been found that if the temperature thus measured is below 780°, the efficiency of the method is deleteriously affected and the quality of glass produced is materially lowered. On the other hand, when the temperature measured as aforesaid, is higher than 920° C., defects as above mentioned crop out, such as marking or marring of the sheet. At such higher temperatures, that is, above 920° C. there is also the added risk that the glass may adhere to the rollers and effect corresponding surface defects.

Within the aforesaid temperature limits the surfaces of the glass sheet are relatively stiff or rigid with respect to the more plastic inner layers or portions thereof. These inner layers are therefore more readily subject to small displacements which result in a ready transfer of glass in the central layers located under a protrusion or protuberance. In other words, when such a protrusion passes between the rollers, an elevated pressure is created below it; and this higher pressure causes a minute transfer of the center or core layers of the glass, to a contiguous location where the pressure is less intense. As a result of this action the mean thickness of the ribbon remains essentially unchanged. When a sheet of glass laminated in accordance with prior art procedures, has deviations from true planarity, of the order of 0.1 mm or more, the method of the present invention is also highly useful to effect a reduction of such deviations to a value materially less than 0.1 mm. In the examples subsequently given it was possible to obtain a smoothness wherein the aforesaid deviations are less than 0.01 mm with respect to an area of between about 1 and 30 cm$^2$.

Glass having a temperature and being processed as previously explained, is introduced between smooth reducing rollers, which may be of metal. The hot glass in passing between these rollers, produces a certain heating of their surfaces. However, the ends of the rollers would otherwise run at a temperature or temperatures below their central portions. In conformity with the present invention, to remedy this temperature difference and to maintain the surface temperature of the rollers constant throughout their length, the central portions are cooled while their end portions are supplied with supplemental heat, as by electrical resistance heaters. The temperature of the roller surfaces should be carefully regulated to remain within the range 400° to 650° C., as previously explained.

The foregoing and other objects and advantages of the invention will become clear to those skilled in the art, after a study of the following detailed description, in connection with the accompanying drawing depicting apparatus by which the invention may be carried into practice, and which is to be taken in an illustrative rather than a limiting sense.

In the drawing:

FIG. 1 is a graph showing as abscissas the surface temperature range of the laminating rollers and, as ordinates, the corresponding range of optimum temperatures of the glass entering between the rollers;

FIG. 2 is a vertical longitudinal section showing schematically an apparatus for practicing the invention;

Figure 3:
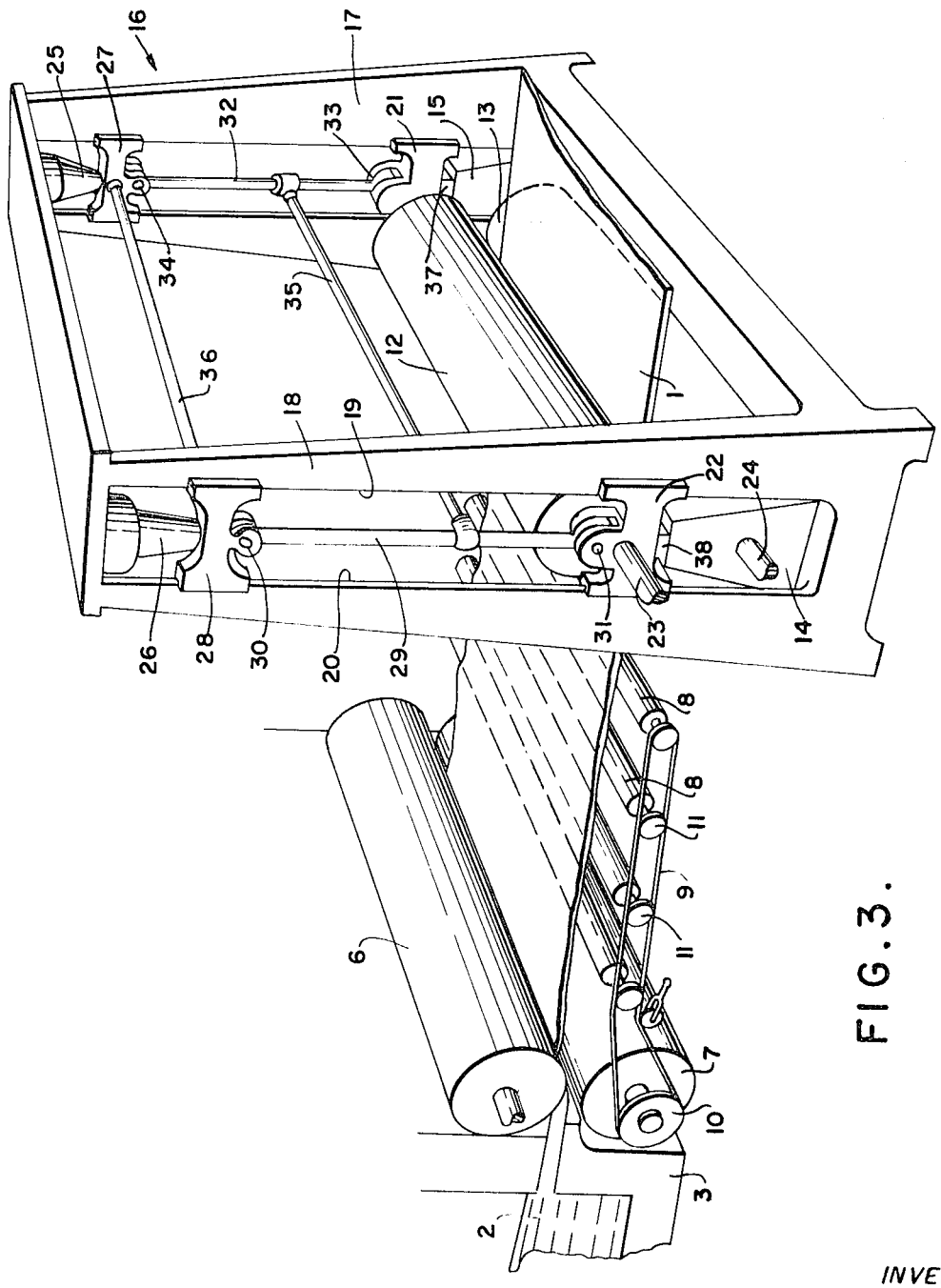
FIG. 3 is a perspective view showing in greater detail the apparatus of FIG. 2.

Referring in detail to the drawing and in particular to FIGS. 2 and 3, a ribbon of glass 1 is formed by drawing from a molten supply 2 contained within the forehearth 3 of the melting tank, a portion of which is identified at 4. The glass passes over refractory lip 5 of the forehearth and then to and between a first pair of spaced parallel laminating rollers 6, 7, driven by power means not shown. These rollers are smooth-surfaced and cooled in a known way by circulation of water or other coolant through their hollow interiors.

On emerging from between rollers 6, 7 the incipient ribbon passes over a number of supporting rolls 8 which as indicated upon FIG. 3, may be driven from roller 7 by chain or belt means 9 passing about a sprocket or pulley 10 fixed to the bearing shaft of the roller, and passing about a number of small sprockets or pulleys 11 each fixed to the bearing shaft of a respective one of rolls 8. The effective diameters of pulley 10 on the one hand, and pulleys 11 on the other, will be such that rolls 8 are driven at the same linear speed as rollers 6 and 7. Alternatively rolls 8 may be replaced by a gas cushion support for the glass, formed by a multiplicity of upwardly-directed gas jets distributed over the area of the ribbon to be supported, as taught by French Pat. No. 1,527,937.

Figure 4:
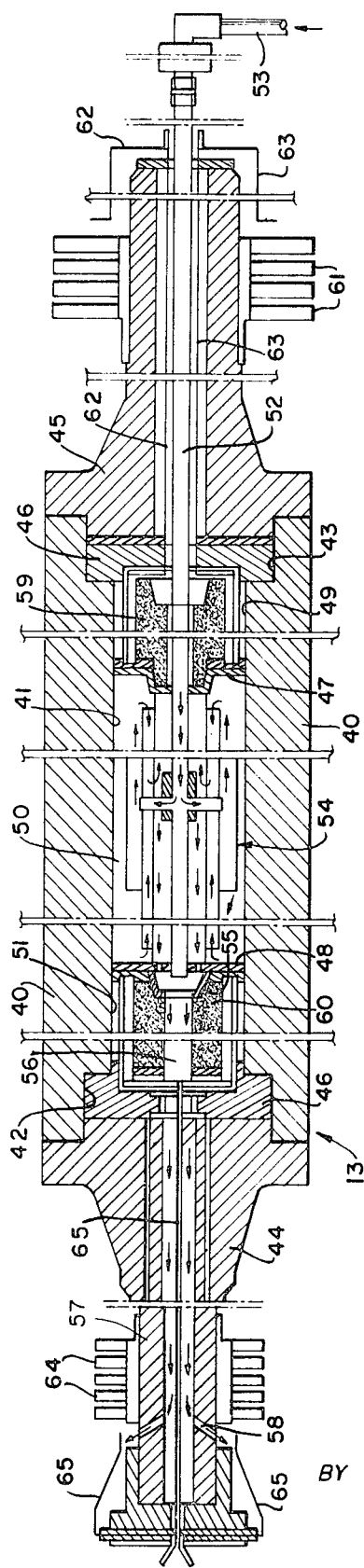
FIG. 4 is a central axial section through one of the two identical rollers shown upon FIGS. 2 and 3.

The incipient ribbon next passes to and between a second pair of rollers 12, 13. At the instant the glass enters between these rollers, its accurately-measured surface temperature is about 780° C. These rollers may have the same diameter and axial dimension of, for example, 0.40 m and 1.60 m, respectively. Because of its good wearing qualities and relatively low cost, perlitic cast iron is an excellent material for making these rollers, which have smooth polished surfaces. FIG. 4 shows one of these rollers 12, 13, in axial section as subsequently described.

Continuing with FIG. 3, lower roller 13 is journaled in bearing blocks 14, 15 fixed in frame 16. This frame has uprights or ends 17, 18 each provided with a slot or opening having parallel vertical guide edges such as are indicated at 19, 20 for upright 18. Each pair of guide edges receives with a smooth guiding fit, a respective one of two slides 21, 22, so that each slide is guided for smooth accurate vertical translation.

Each slide 21, 22 is equipped with a journal for the respective ends of shaft 23 of roller 12. The shaft of lower roller 13 is identified at 24. Shafts 23, 24 are driven by variable speed power means of known type and hence not shown. The linear sped of these rollers will be adjusted, of course, for the speed of travel of the ribbon and the reduction in thickness thereof which they effect.

Vertical jacks which may be of the screw type are fixed at the top ends of uprights 17, 18 and are identified at 25, 26. The threaded shaft of each jack is connected as by a thrust bearing, with a respective one of two slides 27, 28 each of which is guided for smooth accurate vertical translation by and between the guide edges of its upright.

Confining attention to slide 28, a thrust rod 29 is pivoted at its upper end 30, to slide 28 and at its lower end, at 31, to slide 22. Likewise thrust rod 32 positioned with the slot of upright 17, is pivotally connected at 33, 34 to sides 21 and 27, respectively. Rods 29 and 32 are rigidly interconnected near their lower ends, by brace rod 35. Upper slides 27, 28 are like wise interconnected by brace rod 36.

Spacer or gage blocks 37, 38 are provided. For example, block 38 is interposed between its slide 22 and bearing 14. Likewise, spacer block 37 is located between slide 21 and bearing 15. These blocks in cooperation with jacks 25, 26, positively hold rollers 12, 13 spaced a distance determined by the thickness of the blocks and therefore establish the reduction in thickness effect upon the ribbon by the rollers. For instance, if the ribbon on emerging from between rollers 6, 7 has a thickness of about 1.5 mm, the spacing of rollers 12, 13 will be about 1.2 mm, thus effecting a reduction in thickness of the order of 20percent. Under such conditions the jacks exert a force, each of about 3.5 metric tons for a ribbon of glass of the width mentioned. Rollers 12, 13 have an arc of contact with the glass of about 5 percent. Their linear speed is preferably about 9.5 m/min., corresponding to a stretching or attenuation of the ribbon between the two pairs of rollers, of about 10 percent.

After emerging from between rollers 12, 13 the ribbon reexpands appreciably to recover a thickness of about 1.5 mm and 1,400 mm width, that is, about the same dimensions as before passing to and between these rollers. A gas cushion support 39, FIG. 2, supports the ribbon as it emerges from between rollers 12, 13, until it is essentially solid and passes to annealing means generally identified at 40.

FIG. 4 shows in detail the construction of lower roller 13, it being understood that upper roller 12 may be of like construction. The central cylindrical portion 40 has an axial bore 41 counterbored at its ends as at 42, 43, to receive end journal bearing members 44, 45 respectively, having reduced outer ends and rigidly fixed as by threading to portion 40. Packing such as 46 is compressed within the space in each counterbore, between its end wall and the corresponding bearing members 44, 45.

Bore 41 is provided with disc-like partitions 47, 48 axially spaced and which effectively divide the bore into three compartments 49, 50 and 51 wherein different thermal conditions are maintained as previously indicated.

From the right end of roller 13 as viewed upon FIG. 4, a stationary pipe 52 passes axially through a bore in journal member 45, through compartment 49, into compartment 50. Cooling air introduced under pressure at 53, flows through the pipe directly into the central part of compartment 50 where it is directed radially into peripheral contact with the bore in this compartment and then flows through a labyrinth of passageways defined by a coaxial system of cylindrical baffles as generally identified at 54. The construction is such that cooling air is divided and passes in opposite directions from the central part of compartment 50, toward both ends and in surface contact with the corresponding portion of bore 41. Air then passes radially inwardly through central apertures in partition 48.

As shown upon FIG. 4, this partition has a baffle 55 surrounding the aforesaid apertures and connected at its left end with exhaust tube 56 which passes axially to the left through compartment 51 and at its left end connects with an aligned tube 57 passing axially and freely through the bore in journal member 44 to the exterior thereof. Exhausted air escapes through holes 58 in the walls of tube 57, exteriorly of journal member 44.

End compartments 49 and 51 enclose resistance heater elements 59, 60, respectively. Element 59 is fed from slip rings 61 fixed to the roller journal member 45 and from which conductors 62, 63 lead in and along the bore of the journal member, to heater 59. Likewise at the left end of the roller 13, current is led to heater element 60, from slip rings 64 connected with conductors 65, 66 extending centrally through journal member 44. By these means, positive control the temperature of the rollers 12 and 13 is effected so that their surface temperature is essentially constant at the preferred value of 600° C., as measured by an optical pyrometer, actually a type R F, Land pyrometer.

I have found that better results are attained when the uniform surface temperature of the rollers thus attained, is adjusted inversely as the temperature of the glass. Thus, for a glass temperature of about 780° C., it is preferable to maintain the surface temperature of the rollers at about the maximum, for example 620° C., while when the glass is about 920° C., it is preferable to maintain the surface temperature of the rollers at about the minimum, for example 450° C. The graph of FIG. 1 shows the aforesaid relation wherein abscissas represent the temperature of the rollers in degrees centigrade, and ordinates represent surface temperature of the glass to the same scale, as it enters between the rollers 12, 13. By using the graph it is possible to select the optimum temperature of the rollers for any particular surface temperature of the glass within the range given. The graph was prepared for a roller having diameter of about 400 mm (15.75 inches).

The following examples are by way of illustration only and are not to be taken in a limiting sense.

EXAMPLE 1

Glass is melted in a tank 4 and rolled by an apparatus essentially as depicted upon FIG. 2. The glass has the following composition by weight percentages:

| | |
|---|---|
| $SiO_2$ | 71.0 |
| $Fe_2O_3$ | 0.1 |
| $CaO$ | 11.0 |
| $MgO$ | 3.0 |
| $Na_2O+K_2O$ | 14.0 |

| | |
|---|---|
| SO₃ | 0.3 |
| Al₂O₃ | 0.6 |

The molten glass of the aforesaid composition melted in tank 4, flows over refractory forehearth lip 5 and is laminated between rollers 6, 7, cooled by an internal flow of fluid. The incipient ribbon thus formed has a width of about 1,400 mm and a thickness of about 1.5 mm. It passes over supporting means 8 such as rollers or, preferably, a cushion of gas created by apparatus of the type disclosed in French Pat. No. 1,527,937, to and between smoothing and reducing rollers 12, 13. When the incipient ribbon enters between these rollers its temperature as measured by a Land, optical pyrometer type R. U., is about 780° C. The rollers are about 0.40 m in diameter and 1.6 m long. They are smooth surfaced and may be of perlitic cast iron.

EXAMPLE 2

Using the same apparatus as in Example 1, the incipient glass ribbon is formed by and between rollers such as 6, 7. On entrance between the second pair of rollers 12, 13, the ribbon has a width of about 1,400 mm, a thickness of about 4 mm and a surface temperature of about 840° C. The surface temperature of rollers 12, 13 is about 550° C and they are spaced by about 3.7 mm. The force exerted by each of the two jacks 25, 26 is of the order of 2.5 metric tons. Rollers 12, 13 have a linear speed of about 4 m/min. The corresponding speed of rollers 6, 7 is about 3.6 m/min. The reduction of thickness effected by rollers 12, 13 is therefore about 10 percent. After passing rollers 12, 13, the resulting ribbon has a width of about 1,410 mm and a uniform thickness of about 4 mm.

EXAMPLE 3

Using the same apparatus as in Examples 1 and 2, the incipient ribbon of glass emerging from rollers 6, 7 has a thickness of about 12 mm and a surface temperature of 920° C. at which temperature it passes to smoothing rollers 12, 13 whose surface temperature is about 450° C. These latter rollers are spaced about 11.3 mm. The force applied to the ribbon is simply that due to the weight of roller 12 alone. The linear speed of rollers 12, 13 is about 1.3 m/min., and that of rollers 6, 7 about 1.15 m/min. Immediately before entering between rollers 12, 13 the ribbon has a thickness of about 12 mm. The width of the ribbon after passing rollers 12, 13, is about 1,420 mm and a corresponding slight diminution of thickness is effected.

Glass produced by the present method is exceptionally smooth and free of waviness, undulations and other surface defects. Instead of forming the incipient ribbon by and between rollers 6, 7, it may be formed by drawing or by the well-known tin flotation procedure.

Other changes, modifications and substitutions will become obvious to those skilled in the art, after a study of the preceding disclosure which is therefore to be taken in an illustrative sense only.

I claim:

1. The method of smoothing the surfaces of sheet glass by passing the same between rollers, comprising, passing incipient sheet glass at a first surface temperature within about the range 780° to 920° C., and having a viscosity of the order of $10^{6.5}$ to $10^5$ poises to and between a pair of smoothing and reducing rollers, while maintaining the temperature of the rollers at and throughout their lines of contact with the glass, at a second uniform temperature within the range of about 450° to 600° C., said first and second temperatures being determined in accordance with the graph of FIG. 1, within the ranges specified.

2. The method of claim 1, said first and second temperatures, in accordance with the graph of FIG. 1, having a sum which is essentially a constant between about 1,350 and 1,400.

3. The method of forming sheet glass comprising, passing molten glass to and between a first pair of reducing rollers to form an incipient ribbon, passing the incipient ribbon at about 780° to 920° C., and having a viscosity of the order of $10^{6.5}$ to $10^5$ poises to and between a second pair of smoothing rollers, while maintaining the surface temperature of the second pair of rollers along their lines of contact with the glass, at about 450° to 600° C., said surface temperature being selected as the difference between a constant numerical value of about 1,350 to 1,400, and the temperature of the incipient ribbon aforesaid.

4. The method of claim 3, maintaining the surface temperature of the second pair of rollers constant along their lines of contact with the glass, by cooling the central portions thereof while supplying heat to the end portions thereof.

5. Apparatus for smoothing sheet glass, comprising, a frame, a pair of spaced parallel smoothing rollers journaled in said frame to receive and smooth the sheet between them, said rollers being tubular, partition means within each said roller dividing the same into a discrete central compartment and discrete first and second end compartments at and within the respective ends of each said roller, conduit means connected with one end of each said roller for supplying coolant to said central compartment thereof, and heater means within each said end compartment, for supplying heat to the peripheral surfaces of said rollers corresponding to said end compartments.

6. The apparatus of claim 5, said conduit means including a first pipe extending axially into and through one end of each said roller and into said central compartment, there being apertures in said first pipe for discharging coolant radially into the central portion of said central compartment, said conduit means also including a second pipe for exhausting coolant from said central compartment, axially thereof through the other end of said roller, and baffle means in said central compartment directing coolant in each axial direction from said apertures, into contact with the roller peripheral surface corresponding to said central compartment, thence to said second pipe.

7. The apparatus of claim 6, said heater means comprising first and second electric heaters in each said end compartment, respectively.

8. The apparatus of claim 5, means journaling one said roller on an axis fixed with respect to said frame, means mounting the other said roller for guided translation toward and from said one roller, to vary the spacing therebetween, gage block means each positioned between the journals at the respective ends of said rollers and determining the spacing between them, and jack means connected with said other roller, to vary the force exerted on said gage block means.

9. The method of claim 1, said glass having the ingredients by weight: SiO₂ - 70 to 73%; Na₂O + K₂O - 13.5 to 15.5%; CaO + MgO - 11 to 14%; Al₂O₃- up to 3%; other ingredients up to 3%.

* * * * *